United States Patent
McCord

(10) Patent No.: US 8,315,370 B2
(45) Date of Patent: Nov. 20, 2012

(54) SYSTEM FOR SCHEDULING ROUTING RULES IN A CONTACT CENTER BASED ON FORCASTED AND ACTUAL INTERACTION LOAD AND STAFFING REQUIREMENTS

(75) Inventor: Alan McCord, Dublin, CA (US)

(73) Assignee: Genesys Telecommunications Laboratories, Inc., Daly City, CA (US)

(*) Notice: Subject to any disclaimer, the term of this patent is extended or adjusted under 35 U.S.C. 154(b) by 783 days.

(21) Appl. No.: 12/345,038

(22) Filed: Dec. 29, 2008

(65) Prior Publication Data

US 2010/0165977 A1 Jul. 1, 2010

(51) Int. Cl.
*H04M 3/42* (2006.01)
(52) U.S. Cl. ......... 379/221.01; 379/221.14; 379/265.11; 379/265.13; 379/265.14; 379/266.02; 379/266.03; 379/272; 379/273
(58) Field of Classification Search ............. 379/265.02, 379/265.05, 265.14; 370/270; 705/7.12, 705/7.39, 7.14
See application file for complete search history.

(56) References Cited

U.S. PATENT DOCUMENTS

| | | | | |
|---|---|---|---|---|
| 5,590,188 A * | 12/1996 | Crockett | ................. | 379/265.02 |
| 5,911,134 A * | 6/1999 | Castonguay et al. | ........ | 705/7.12 |
| 6,044,355 A * | 3/2000 | Crockett et al. | ............. | 705/7.39 |
| 6,970,829 B1 * | 11/2005 | Leamon | ....................... | 705/7.14 |
| 2008/0205613 A1 * | 8/2008 | Lopez | ..................... | 379/114.02 |

* cited by examiner

*Primary Examiner* — Joseph J Nguyen
(74) *Attorney, Agent, or Firm* — Christie, Parker & Hale, LLP

(57) ABSTRACT

A system for scheduling resources and rules for routing includes a server connected to a network, a scheduling application executable from the server, and at least one programmable software agent for scheduling routing rules. The scheduling application receives statistics about forecast arrival rates for incoming interactions and current resource availability data and schedules resources and routing rules according to the forecast requirements the software agent propagating the portion of scheduling relative to the routing rules.

8 Claims, 4 Drawing Sheets

SYSTEM FOR SCHEDULING ROUTING RULES IN A CONTACT CENTER BASED ON FORCASTED AND ACTUAL INTERACTION LOAD AND STAFFING REQUIREMENTS

BACKGROUND OF THE INVENTION

1. Field of the Invention

The present invention is in the field of telephony, including data network telephony (DNT) Internet protocol network telephony (IPNT), and connection-oriented, switched telephony (COST), and pertains particularly to a system for optimizing scheduling of contact center resources including scheduled modification of routing strategies.

2. Discussion of the State of the Art

The field of telephony has undergone many improvements over the years relative to costs of services, quality of services, and efficiency. State-of-art contact centers now handle a myriad of interaction types and subtypes using state-of-art computer telephony integrated (CTI) equipment and facilities.

In current art, scheduling of resources is often performed by an automated system that is integrated with workflow management and agent statistics. The system forecasts arrivals (interaction load) and schedules the level of available staff (agents, knowledge workers, etc.) required to handle the load at the rate of arrivals as predicted. Each agent or auto-component utilized is defined as a schedulable contact center resource. The actual process of forecasting in a contact center environment involves predicting interaction load (calls, emails, and other communication types) for certain time periods and attempting to meet the expected demand by scheduling staff and systems during those periods. Scheduling is typically a mathematical problem of finding available resources for specific time periods wherein arrivals are expected to occur. Further, each agent in the contact center is considered a schedulable resource.

A problem with current state-of-art systems known to the inventors is that the routing logic in a contact center is assumed fixed and centralized within the center. Routing strategies are designed to optimize workflow and efficiency by making routing decisions based on real-time metrics in the contact center at the time of a pending interaction. Many strategies are monolithic, containing a single processing thread. Sometimes several routing strategies are associated or grouped into a collection of single-threaded processes that may or may not link to one another.

A contact center forecasting system makes predictive assessments of what real workload requirements will look like throughout a given work period. Those assessments drive scheduling and commitment of resources. If predictions are off significantly then additional costs may be incurred because of scheduling changes and re-quantified commitment levels of resources. Although initial forecasts may be fine tuned by periodic consultation with available statistics, interaction loads and available staffing levels for different interaction types may not be orchestrated to achieve the most efficient and cost effective workflow at certain times or throughout the work period.

What is needed in the art is a system that can schedule or directly order dynamic abstract routing strategy changes based on perceived and real interaction load verses available or scheduled contact center resources including live agents. That is, an additional variable should be introduced, which variable is amendment of routing strategy.

SUMMARY OF THE INVENTION

The problem stated above is that flexibility is desirable for routing interactions in a contact center, but many of the conventional means for interaction routing such as executable routing strategies are monolithic or at best centralized to the contact center environment and basic policies. The inventors therefore considered functional elements of an interaction routing system, looking for elements that exhibit distributability that could potentially be harnessed to provide intelligent routing but in a manner that would not create inflexibility.

Every routing system is driven by incoming interactions and routing rules one by product of which is a number of interactions that are dropped or go un-routed because of a resource availability problem. Most interaction routing systems employ servers and software to conduct internal agent level routing of voice and text-based interactions and servers running software are typically a part of such apparatus.

The present inventor realized in an inventive moment that if, at a point in time, interactions could be routed intelligently according to scheduled rules, significant retention of customers might result. The inventor therefore constructed a unique scheduling system for scheduling contact center resources that allowed interaction routing to be performed in a more flexible manner, but constrained certain interaction types during certain periods to other treatments or to delayed treatments to compensate for real resource availability. A significant improvement results, with no impediment to customer retention created.

Accordingly, in one embodiment of the present invention, a system for scheduling resources and rules for routing comprising, a server connected to a network, a scheduling application executable from the server, and at least one programmable software agent for scheduling routing rules. The scheduling application receives statistics about forecast arrival rates for incoming interactions and current resource availability data and schedules resources and routing rules according to the forecast requirements the software agent propagating the portion of scheduling relative to the routing rules.

In one embodiment the resources include live agents and the network is a local area network. In one embodiment the incoming interactions include voice interactions and text interactions. In one embodiment the server is a workforce management server. In a preferred embodiment the system is implemented in a contact center.

In a variation of the above embodiment the workforce management server gets statistics from a statistics server connected to the local area network and availability data relative to resources from a configuration server connected to the network.

In one embodiment schedulable resources include live agents and automated attendants. In one embodiment the scheduling application continues to receive statistics about arrival rates during the work period. In one embodiment the routing rules are rules that are decomposed from existing routing strategies.

In one aspect of the invention a method is provided for scheduling the execution of a selected set of routing rules including the steps (a) providing at least one programmable software agent for propagating commands from a scheduling application to elements requiring scheduling, (b) determining scheduling requirement and resource availability, (c) scheduling resources for use, (d) using the software agent, accessing the rules and selecting individual ones of those rules for time-based execution, and (e) enabling the rules to execute in a sequence within a pre-defined time period.

In one aspect of the method in step (a) the elements requiring scheduling include rules, routing strategy, and voice application logic. In one aspect in step (b) the scheduling requirement is based on a forecast arrival of interactions and resource availability includes the work times for human agents. In one aspect in step (b) the scheduling requirement is spread out over a work period and subject to change between periods. In a preferred aspect in step (c) the resources include live agents.

In one aspect in step (d) the rules are selected and scheduled to be used within a specific window of time. In one aspect in step (e) the software agent assembles the rules into a strategy. In one aspect in step (e) one or more time windows are inserted into one or more of the selected rules scheduled for execution.

In one aspect of the method in step (e) the sequence replaces a previous sequence when the time period begins. In another aspect in step (e) the sequence executes along side a previous sequence for a defined type of interaction when the time period begins.

BRIEF DESCRIPTION OF THE DRAWING FIGURES

DETAILED DESCRIPTION

The inventors provide a system and methods for scheduling different routing rules along with contact center resources, wherein routing strategy is modified for specific treatment of events at specific times of treatment. The invention is described in enabling detail in the following embodiments.

Figure 1:
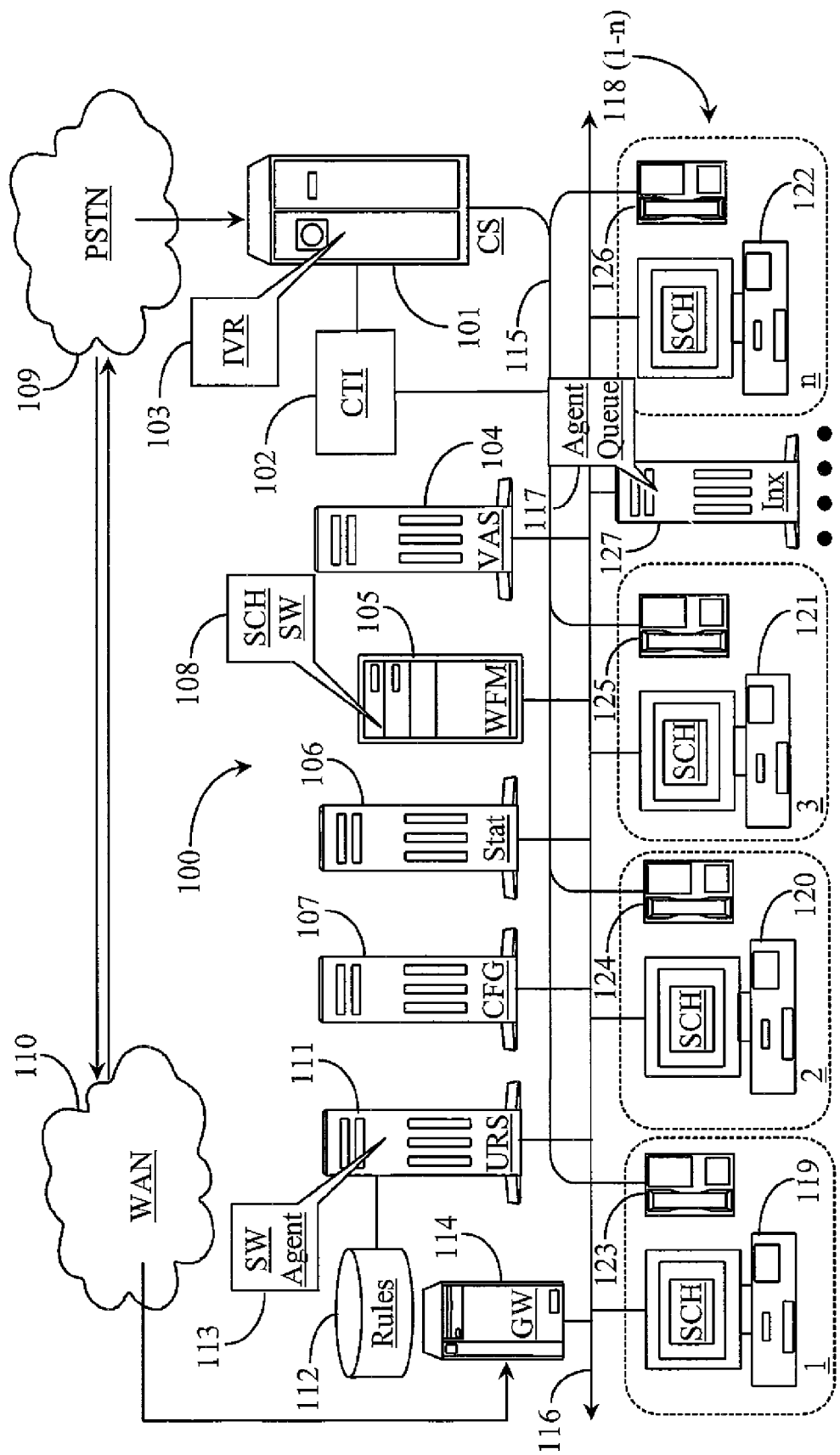
FIG. 1 is an architectural view of a contact center practicing routing rule scheduling according to an embodiment of the present invention.

FIG. 1 is an architectural view of a contact center 100 practicing routing rule scheduling according to an embodiment of the present invention. Contact center 100 is a state-of-art contact center equipped to handle diverse interactions types in addition to telephone voice calls. Center 100 includes a local area network (LAN) illustrated herein as LAN 116. LAN 116 is Internet enabled for transfer control protocol over Internet protocol (TCP/IP) and accepts externally sourced interaction events through an IP gateway (GW) 114. GW 114 may be a gateway router connected to LAN 116 for routing interaction messages and requests typically sourced from the Internet. The internet is logically represented in this example as a wide-area-network (WAN) 110.

One or more companies represented by contact center 100 may have Web pages hosted in a Web server (not illustrated) as a digital method for customers to access contact center services. Contact center 100 has a central telephone switch (CS) 101 for routing incoming events to available resources within the center. Switch 101 may be an automated call distributor (ACD) or a private branch exchange (PBX) switch. CS 101 is enhanced for intelligent routing through a connected computer telephone integration (CTI) processor/server 102. CTI processor/server 102 provides intelligent control over switch 101 for agent level routing (ALR). Switch 101 has a digital medium provided thereon or accessible thereto for storing software used to operate the switching function.

CS 101 may be connected to a telephone network such as exemplary public switched telephony network (PSTN) 109 illustrated as a network cloud above the switch. CS 101 receives incoming calls from external telephone network switches. An interactive voice response (IVR) system 103 is illustrated on CS 101. IVR 103 provides voice prompting and voice or tone recognition for customer interaction at the switch before routing determinations are made. IVR 103 and switch 103 may be "soft" (implemented as software) or hardware-supported components. In this case switch 101 is a hardware component connected to CTI 102 via a CTI link.

CTI 102 is connected to LAN 116 within center 100. CS 100 may take calls from WAN 110 or from PSTN 109. Calls from PSTN 109 may be placed through the Internet and routed by GW 114. Calls may also originate in the Internet and may be carried through PSTN 109 to CS 101 to wait for further routing. An interaction server (Inx) 127 is provided within contact center 100 and connected to LAN 116. Inx 127 has a digital medium provided thereon or accessible thereto and is adapted to represent all interaction in contact center 100 in an abstract way using an abstract markup language.

LAN 116 supports a number of agent workstations 118(1-n) operated by contact center agents for the purpose of handling interactions and for performing other contact center-related business. Each agent workstation includes a LAN-connected personal computer (PC). In this example PC 119 is illustrated within agent workstation 118 1, PC 120 is illustrated within agent workstation 118 2, PC 121 is illustrated within agent workstation 118 3 and PC 122 is illustrated within agent workstation 118 n. PCs 119-122 are connected to LAN 116.

Each agent workstation also includes an agent telephone in this example. An agent telephone 123 is illustrated within agent workstation 118 (1), telephone 124 in agent workstation 118 (2), telephone 125 in agent workstation 188 (3) and telephone 126 is agent workstation 118 (n). Telephones 123-126 have connection to CS 101 via internal telephone wiring 115 as is typical with connection oriented switched telephony (COST). In one embodiment telephones 123-126 may be PBX telephones or IP soft telephones installed on agent PCs.

A number of servers are illustrated in this example and are connected to LAN 116. A voice application server (VAS) 104 is illustrated in this example and is adapted by digital medium and processor to store and serve voice applications for IVR presentation. VAS 104 may be connected to CTI server/processor by a separate network (not illustrated) in addition to LAN network connectivity.

A workforce management (WFM) server 105 is illustrated in this example and is adapted by digital medium and processor to store and serve agent and contact center resource and work assignments scheduled by a scheduling software application 108.

A statistics (Stat) server 106 is illustrated in this example and is adapted by digital medium and processor to store and serve statistics relevant to contact center operation. Statistics may include realtime contact center metrics and states of resources and historical statistics used in predictive calculations within the center.

A configuration (CFG) server 107 is illustrated in this example and is adapted by digital medium and processor to serve configuration objects to routing strategy in an object-oriented environment. A configuration object might include an agent skills object for an agent working in the center.

A universal routing server (URS) 111 is illustrated in this example and is adapted by digital medium and processor to serve routing strategy to the interaction server for CTI-assisted routing of incoming events. URS 111 may store routing strategies, which may contain one or more execution points for executing one or more routing rules enabling intelligent end-point routing within the contact center. Rules for routing may be contained in a data repository illustrated herein as repository 112 labeled rules.

In one embodiment of the invention, existing routing strategies in URS 111 may be decomposed or stripped off the individual routing rules, creating a rules set that may be independently executed by installing start and stop commands in each rule. A set of rules then may be reordered to create a different routing strategy. In one embodiment executable rules may be created and associated in sequence with other routines to create a routing strategy.

In practice of the invention, routing rules are executed by schedules such that at different periods of time different routing strategies are employed according to schedule. WFM server 105 has scheduling software (SCH SW) 108 provided thereon and executable therefrom. SW 108 relies on predictive statistics relative to predicted or forecast arrival rates into the contact center. Arrival rates pertain to the load of incoming calls, emails, chat requests, and other potential communication events. SW 108 plans, based on the forecast, what contact center resources, including live agents will be required to handle the forecast arrivals. SW 108 has access to the work schedules of all of the live agents, which are treated by the SW as schedulable resources.

SW 108 schedules the resources based on predicted need and each live agent logged into the WFM system receives an assignment or schedule (SCH) illustrated one each on PCs 119-122. In addition to scheduling live agents and availability of other resources, SW 108 schedules one or more software agents (SW agent) such as one or more SW agents 113 illustrated at URS 111. SW agent 113 is computational piece of logic that is preprogrammed to execute one or more routing rules of a routing strategy rules set based on the scheduling of live agents in the system. The one or more rules are scheduled by the software agent to fire in a sequence as a routing strategy. In this way a routing strategy may be dynamically modified according to predicted or real need relative to arrival rates and available resources.

A contact center work period may include peak periods where arrival rates are predicted to be higher than would be expected at other periods within a work schedule window. It is therefore important that enough live agents are scheduled to be available to handle the extra load on the system. The interaction load may include both voice and text events. At the beginning of the work period, SCH SW 108 may schedule a number of agents to work queue 117, for example, from 7:00 AM to 10:00 AM. The scheduler may simultaneously schedule a pre-programmed SW agent, such as agent 113, to assemble and enable for execution a routing strategy from a set of routing rules. The routing strategy may affect the nature of IVR presentation of a voice application served from VAS 104.

The voice prompts affected by the routing strategy are therefore dynamically selected and presented according to the existing strategy and rules. In this way, between 7:00 AM and 10:00 AM the IVR presentation to incoming callers at switch 101 ultimately directs callers to live assistance or agent level routing (ALR), for example, and routes interactions to queue 117 represented in Inx 127. Agents operating at stations 118 (1-*n*) subscribe to queue 117 and take events from the queue as the events come in. At 10:00 AM several agents may be scheduled for other duties such as attending an important meeting. Some may be taking early lunch; the system may therefore not have as many live agents at hand to work the queue say between 10:00 AM and 12:00 PM.

Based on this pre-known fact, SW 108 may schedule a second SW agent like agent 113 to decompose the existing routing strategy that routes the agents to queue 117 and to assemble and enable a strategy from the same relative set of rules that may route a percentage of the incoming events to an IVR port between the hours of 10:00 AM and 12:00 PM. At the IVR port the voice application is reordered to present a sequence of prompts that may ask the callers to leave a call-back number for a call back between 12:00 PM and 2:00 PM, or to please call in again after 12:00 PM when sufficient live agents will again be available according to schedule.

In a preferred embodiment, SW 108 schedules all contact center resources based on predicted arrival rates and schedules the SW agents to modify the routing strategy at specific periods during the work period based on the predicted circumstantial changes in resource availability against predicted arrival rates. In one embodiment realtime statistics served from Stat server 106 may be used to refine scheduling periodically throughout a work period. One case might be where the actual rates at the beginning of a period are lower than the predicted rates, causing a revision in the predicted arrival rate for the rest of the period. This may result in a dynamic schedule change that may override the previous schedule.

The scheduling optimization system of the invention applies to incoming voice calls registered at switch 101 for ALR and to incoming voice and text interaction requests coming in through GW 114, which may be an interaction router.

Figure 2:
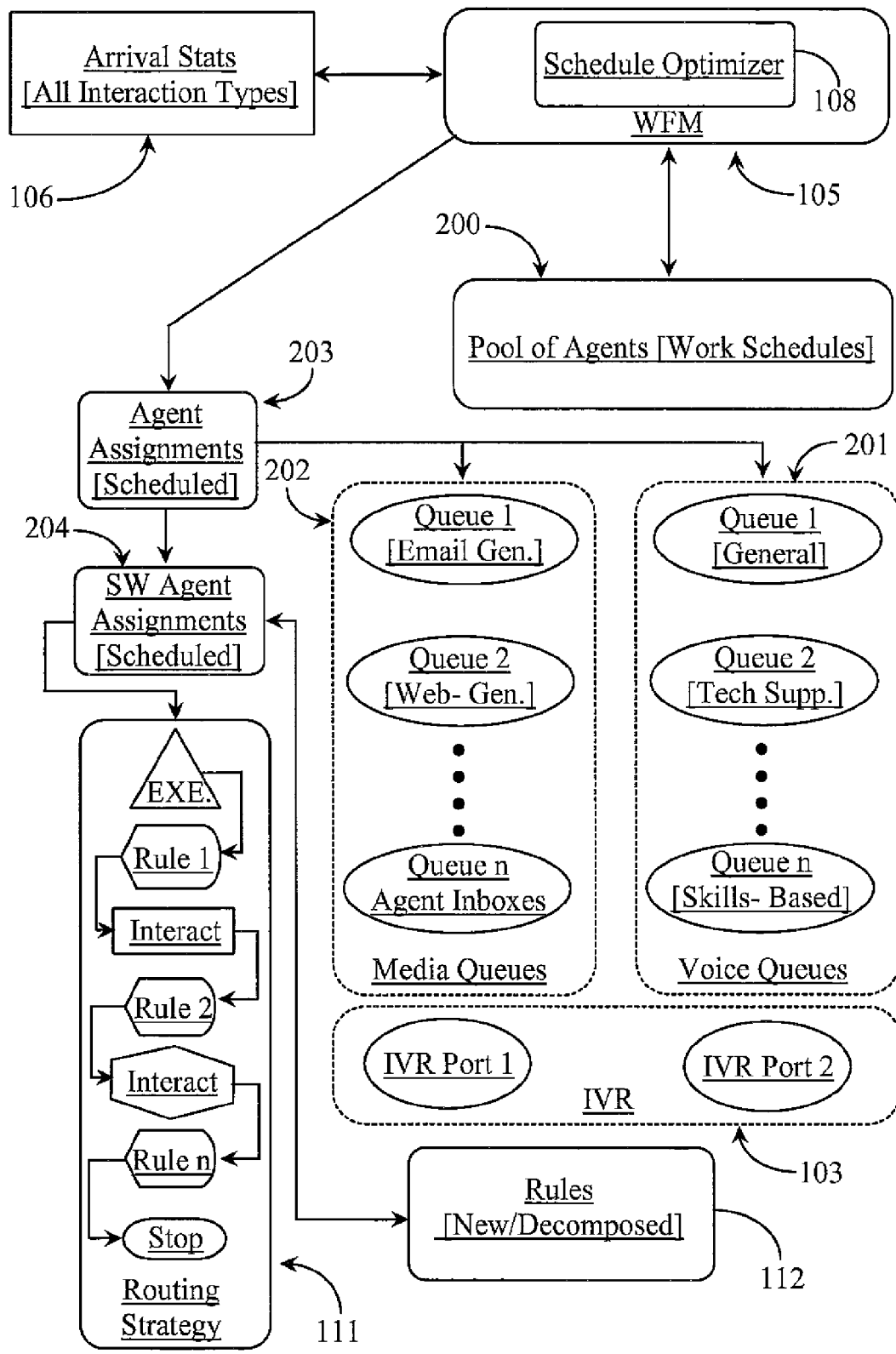
FIG. 2 is a block diagram illustrating components of a system for scheduling routing rules according to an embodiment of the present invention.

FIG. 2 is a block diagram illustrating components of a system for scheduling routing rules according to an embodiment of the present invention. Some of the components illustrated in this example are the same components illustrated in FIG. 1 above. Therefore, those components retain their same element numbers and shall not be reintroduced. WFM server 105 is illustrated running schedule optimizer 108 analogous to SCH SW 108 of FIG. 1. Schedule optimizer 108 subscribes to arrival statistics for all interaction types from Stat server 106. The arrival statistics are forecast arrival rates for the interactions predicted throughout the work period. These statistics may be based on historical averages and may be adjusted according to current sales efforts and campaigns.

Optimizer 108 also subscribes to agent work schedules for a pool of agents 200 that work at the center. These schedules consists mainly of the agent shift description including log-in and log-out times and job descriptions, skill levels and any other relevant information that may affect availability for certain tasks. Based on the arrival statistics and the pool of available agents, the scheduling SW produces agent assignments 203 for the current work period. The assignments may include shift times and queue assignments.

A queue system 201 is illustrated in this example and represents a voice queue system containing a queue 1 or general queue, a queue 2 for tech support and a queue n for skills based routing. Specific numbers of live agents may be assigned to work the queues at specific times during the work period. A media queue system 202 is illustrated in this example and represents a system for queuing Web requests and interaction. A queue 1 is a general email queue. A queue 2 represents a general queue for Web sourced requests and a queue n represents specific agent inboxes for email or messages.

Other available resources include automated treatments by IVR system 103, which includes an IVR port 1 and an IVR port 2. IVR ports may be scheduled for availability according to expected arrival rates, for example one port schedules and then a second port activated according to expected demand. IVR interaction may also lead to live assistance and a certain percentage of callers treated by IVR will ultimately be routed to a live agent. At the same time that live and automated resources are scheduled for availability, the scheduling SW schedules one or more SW agents 204 that are charged with the responsibility of modifying and enabling execution of routing strategy according to schedule.

In URS 111 an exemplary routing strategy is illustrated beginning with an execution step (EXE) generally triggered by an incoming request for routing strategy. More than one strategy may be running in server 111 to deal with routing of different types of interaction requests. The exemplary strategy illustrated in this example includes a step for executing a routing rule 1, a step for executing a routing rule 2 and a step for executing a routing rule n. Interaction steps are interspersed between rule execution steps and the strategy has a stop point or termination step for each request the strategy is executed for. The strategy may be a very simple strategy or a more complicated strategy that as one or more branches depending on results of interaction that occur at the IVR system or with a live attendant or both.

In general, rules 1-n are pre-scheduled by a SW agent 204 to be available for use by a specific routing strategy that is assembled relative to the specific rules. The rules of the strategy are executed in logical sequence based on results interaction. Rules in the strategy are rules that SW agent 204 has scheduled for a specific period during the work period at the contact center. Rules repository 112 contains rules that were decomposed from an existing monolithic strategy or rules that are created as independent rules. The strategy illustrated is used as the basic routing strategy for voice calls, for example, incoming into the center within a specific window of time during the work period.

When the window for a specific strategy dependant on a specific number of rules expires, a SW agent 204 may select a next batch of rules by schedule to assemble a routing strategy that is applicable for events incoming into the center during the next time window specified. Rules may be scheduled for selection and application and those rules that have time variable may have those time variables changed by the SW agent as a result of scheduling requirements. For example, a rule may specify an available call back window for a certain category of incoming requests. For example, all calls of type L incoming after 12:00 PM route to IVR port 2 for scheduled treatment. The SW agent may also schedule the correct prompt to be played to those callers and may insert a schedule from the scheduler into the prompt to inform callers of the available window for receiving a call back from a live agent. The rules then are scheduled as available contact center resources and may act as scheduling agents for scheduling later interaction.

Beginning at 12:00 PM callers requiring live assistance may be treated by IVR to direct the callers to a different time for interacting with a live agent because of scheduling constraints that provide a limited number to no available agents say between 12:00 PM and 2:00 PM. The rule may contain a time constraint for incoming and for outgoing interaction to be offered say between 2:00 PM and 4:00 PM. The strategy is thus modified and the modification prompts a change in IVR presentation such that the callers are presented call back options that if accepted result in live interaction occurring with those callers via second incoming call attempts made by the callers or by scheduled outbound calls or a combination of both if both options are given. The live interaction then is basically deferred to the scheduled window of 2:00 PM to 4:00 PM by the contact center scheduling software.

During the IVR presentations it can be determined how many callers accept one of the offered options, and predicted call arrival rates for that window may be revised though the results are still predictive, assuming that all callers who selected the option will be available at the scheduled time to interact with a live agent of the center. Minor adjustments to workforce assignments might be made throughout the work period based on ongoing consultation with the newest statistics available. In one embodiment routing by the metrics of EWT and agent availability may still be practiced in addition to routing by scheduled resource requirements. In one embodiment the SW agent schedules one or more rules in repository 112 and also assembles a strategy or modifies an existing strategy for using those rules. In another embodiment the rules are schedule and a strategy takes form based on a logical template or an indication of the order that the assembled rules should be executed.

Figure 3:
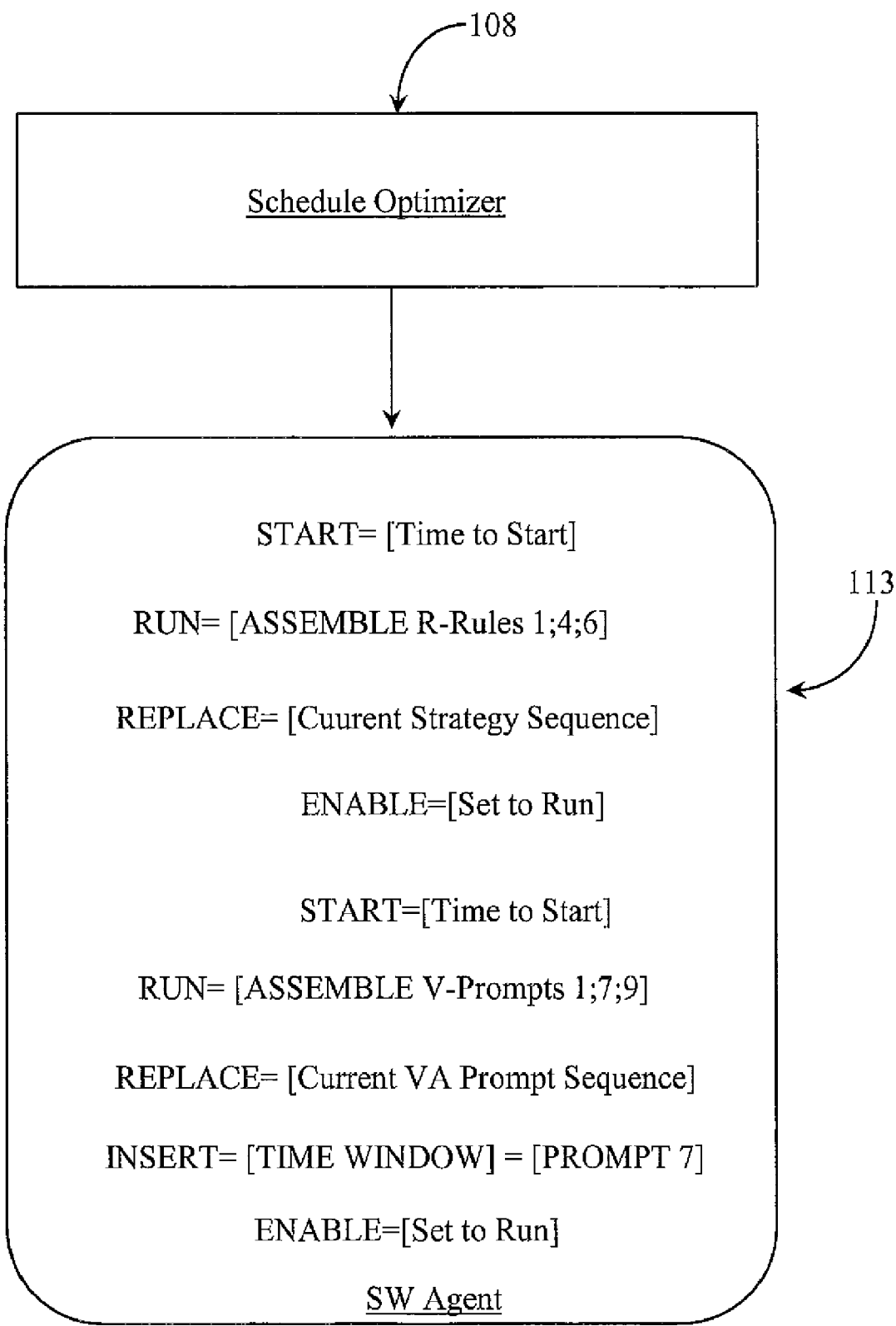
FIG. 3 is a block diagram illustrating software agent 113 of FIG. 1.

FIG. 3 is a block diagram illustrating software agent 113 of FIG. 1. Schedule optimizer 108 schedules software agents along with real agents. A software agent 113 has a scheduled start time that is provided by the scheduler. Logic for RUN may include a list of rules to assemble into a strategy. In this example rules 1, 4, and 6 are listed. The logic may contain a command for replacing the strategy that was currently running and that will no longer be used. The logic may include a step for enabling the strategy to execute at the next request for routing strategy.

SW agent 113 may also schedule IVR prompting according to the scheduled time. Logic may include reordering IVR prompts to include, in this case voice prompts 1, 7, and 9. Logic may be included for replacing the current running sequence. SW agent 113 may contain logic for inserting a time variable into one of the voice prompts, in this case prompt 7. The SW agent may then enable the voice application for IVR presentation to the next caller. A set of rules and an IVR prompt sequence may be enabled to run along side existing strategy and IVR presentation for a specific type of interaction. The scheduler sets up the available resources including live agents and sets the scenario for use of the agents' time for specific periods during the work schedules.

In one embodiment, scheduling live and software agents can be performed across network boundaries. For example, this may be done in a federated environment where the selected rules for scheduling may be distributed over the federated network to other contact centers. In this case, one center may be responsible for scheduling the resources of more than one other contact center by distributing the rules and pre-programmed software agents for enabling the scheduled rules. In this case configurations of the other centers including workforce data would be required at the time of scheduling.

Figure 4:
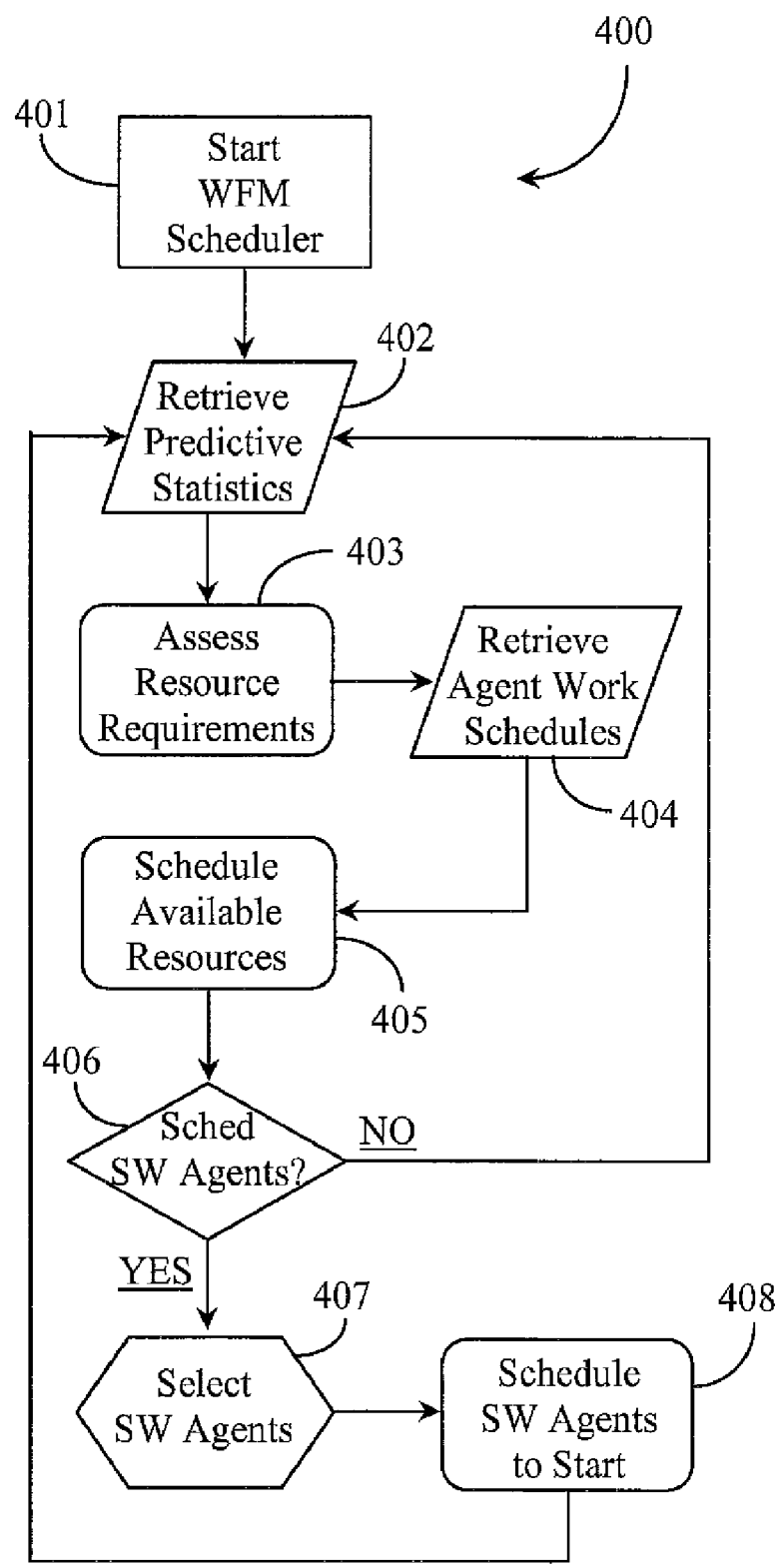
FIG. 4 is a process flow chart illustrating steps 400 for scheduling SW agents and real agents according to an embodiment of the present invention.

FIG. 4 is a process flow chart illustrating steps 400 for scheduling SW agents and real agents according to an embodiment of the present invention. At step 401 a WFM scheduling SW is executed. At step 402 the scheduler retrieves predictive statistics relevant to the expected interaction load. At step 403, the scheduler assesses resource requirements. In this step the scheduler predicts what resources will be required in order to handle the predicted interaction load for a given work period.

At step 404 the scheduler retrieves the agent work schedules of live agents expected to work during the period. In this step the scheduler looks at what agents will be available and when they will be available and not available. At step 405 the scheduler schedules the available resources according to the predicted interaction load statistics. In this step the scheduler creates the assignments for the real agents and schedules use of other resources like IVR ports and the like.

At step 406 the scheduler determines if any software agents need to be scheduled. If the current assignments are deemed sufficient to handle the interaction load predicted and the existing rules and strategies are appropriate for use of the resources, then the process loops back to step 402 and the scheduler continues to retrieve predictive statistics on a change based or time based notification. For example, as the period commences, real-time monitoring may result in a change in the predicted interaction load. Scheduling refinements may be ordered based on a change in statistics.

If at step 406 the system determines that one or more pre-programmed SW agents need to be scheduled to run, then at step 407 the scheduler selects the required SW agents for scheduling. The software agents are pre-programmed with the logic needed to schedule rules. At step 408 the scheduler schedules the required SW agents to start at the scheduled times provided by the scheduler. Outputs of the scheduler may include time windows or ranges that are inserted into one or more rules that may also affect IVR prompts played to callers or information presented in text or in HTML to Web based visitors. For example, a visitor at the Web site may request a live chat with an available agent. A message may pop up in the visitor's browser with a form to enable acceptance of a scheduled chat under certain circumstances at a specific time period. The logic used may vary according to predicted interaction load and other factors. The rules governing the chat interface have been changed by the SW agent scheduled along with the real agents. For example instead of the previous strategy of routing the chat request to an agent queue, the requester is prompted to schedule a chat at some later time period.

The present invention may be practiced in any contact center environment where resource scheduling is performed and rules-based routing is practiced. It will be apparent to one with skill in the art that the scheduling system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught.

There may be many alterations made in the descriptions without departing from the spirit and scope of the present invention.

What is claimed is:

1. A system for scheduling resources and rules for routing comprising:
   a workforce management server receiving statistics from a statistics server connected to a local area network and availability data relative to resources from a configuration server connected to a network, the workforce management server connected to the network and executing at least one routing strategy having a rules set;
   a scheduling application executable from the workforce management server scheduling resources and software agents according to the routing strategy; and
   at least one programmable software agent executed by the scheduling application for scheduling one or more routing rules of the routing strategy rules set;
   characterized in that the scheduling application receives statistics about forecast arrival rates for incoming interactions and current resource availability data and executes the software agent to schedule the resources and routing rules according to forecast requirements, wherein one or more rules of the rules set are scheduled by the software agent to fire in a sequence alternatively from the routing strategy according to modified predictions or real need relative to arrival rates and available resources and the software agent propagates scheduling relative to the routing rules.

2. The system of claim 1 wherein the resources include live agents and the network is a local area network.

3. The system of claim 1 wherein the incoming interactions include voice interactions and text interactions.

4. The system of claim 1 implemented in a contact center.

5. The system of claim 1 wherein schedulable resources include live agents and automated attendants.

6. The system of claim 1 wherein one or more software agents are schedulable resources.

7. The system of claim 1 wherein the scheduling application continues to receive statistics about arrival rates during a work period.

8. The system of claim 1 wherein the routing rules are rules that are decomposed from existing routing strategies.

* * * * *